July 18, 1972 J. C. TROCCIOLA 3,677,823
FUEL SATURATOR FOR LOW TEMPERATURE FUEL CELLS
Filed Oct. 6, 1969 2 Sheets-Sheet 1
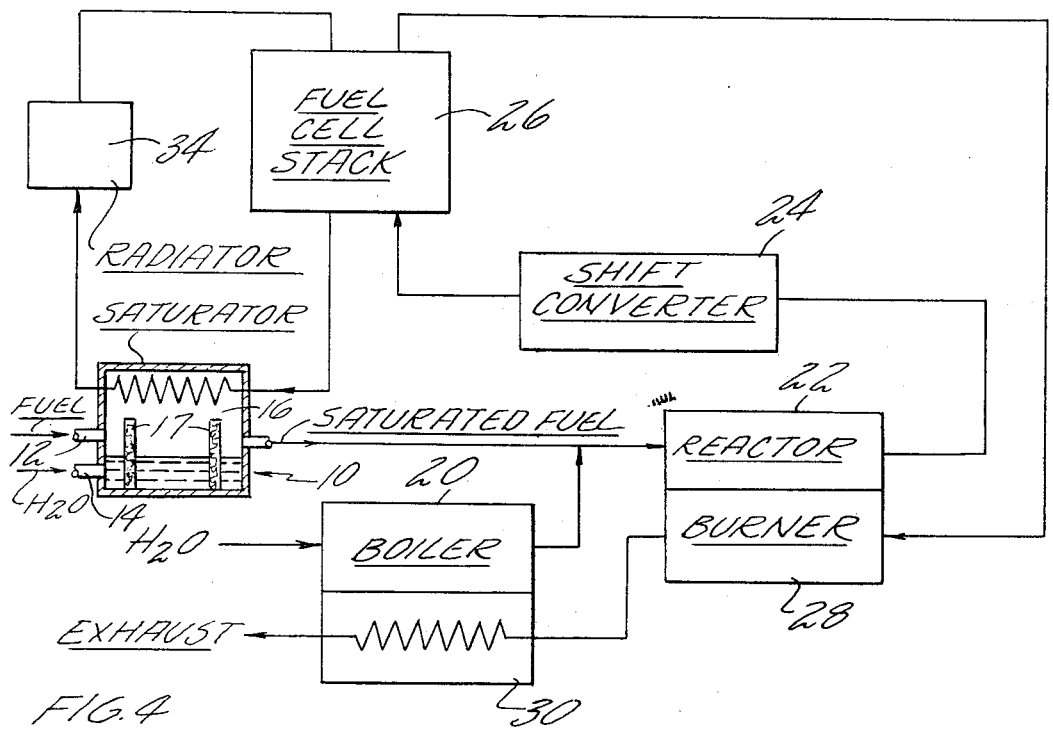
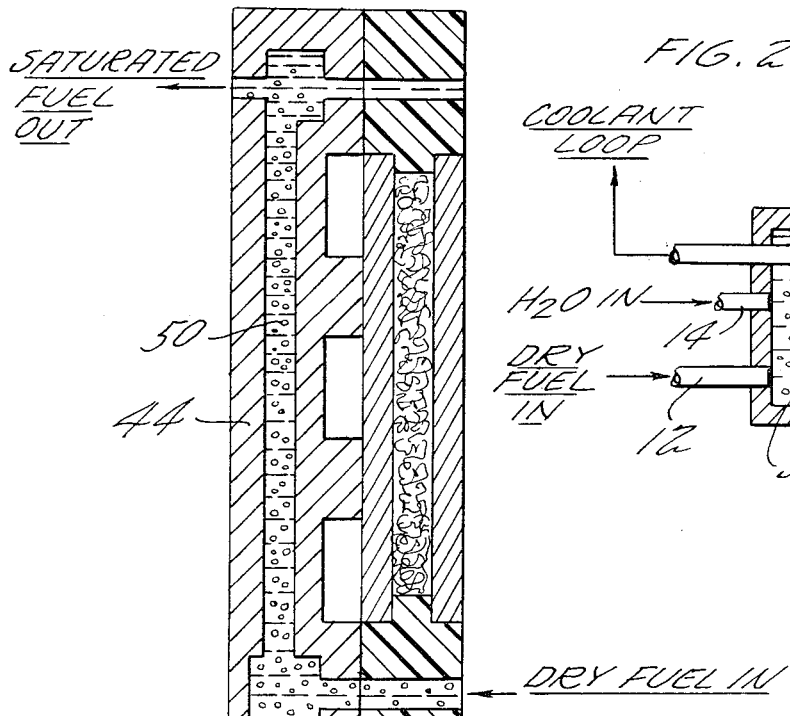
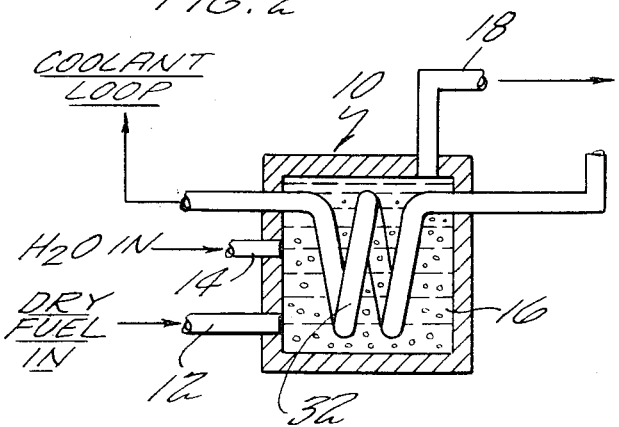
INVENTOR
JOHN C. TROCCIOLA
BY Edmund C. Meisinger
ATTORNEY

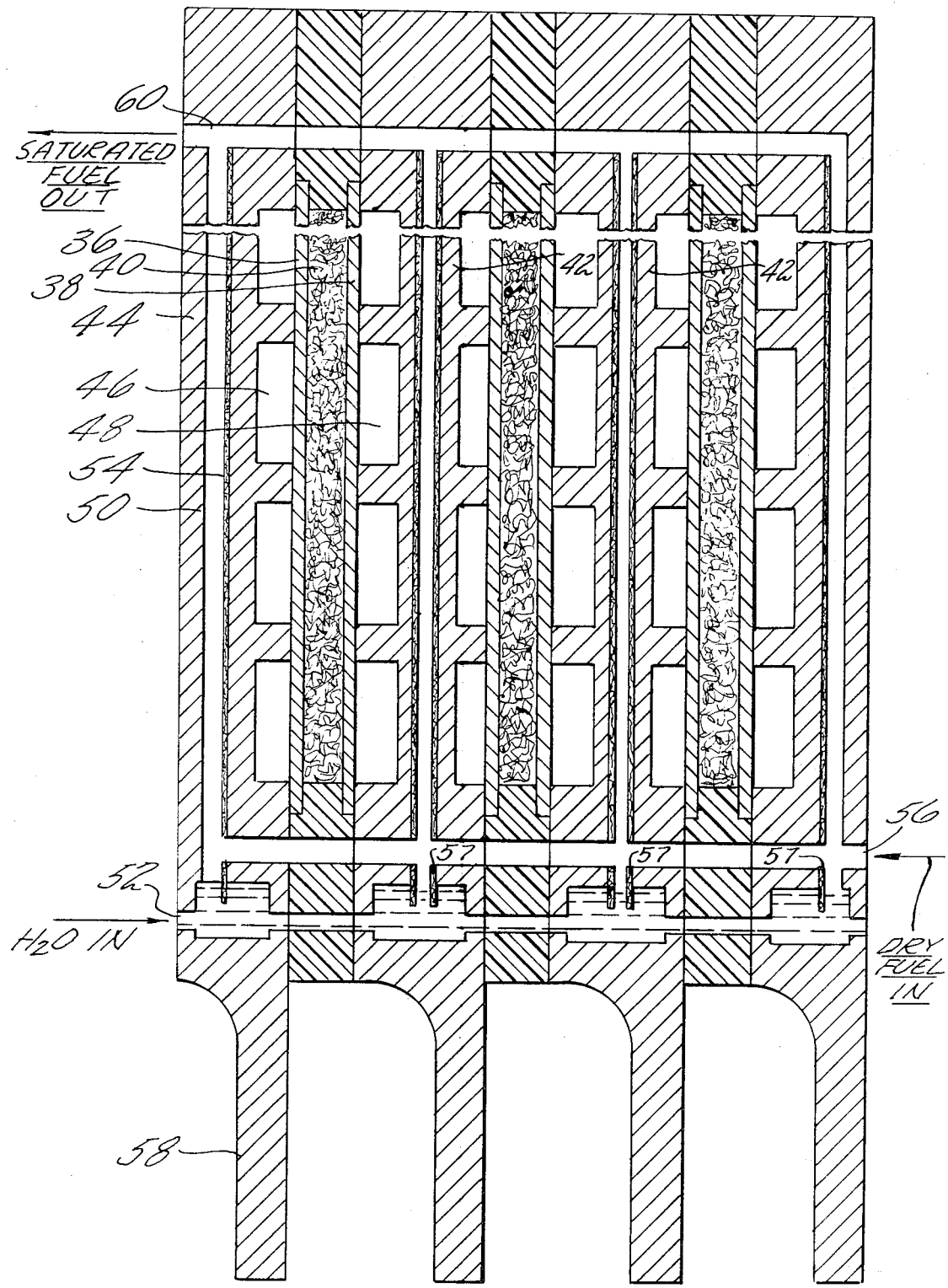

United States Patent Office 3,677,823
Patented July 18, 1972

3,677,823
FUEL SATURATOR FOR LOW TEMPERATURE FUEL CELLS
John C. Trocciola, Glastonbury, Conn., assignor to United
Aircraft Corporation, East Hartford, Conn.
Filed Oct. 6, 1969, Ser. No. 863,944
Int. Cl. H01m 27/14
U.S. Cl. 136—86 C                    8 Claims

ABSTRACT OF THE DISCLOSURE

Fuel cell waste heat supplies the energy to saturate a dry fuel gas supply stream with water vapor. The fuel saturator may be featured as an integral component of the fuel cell stack. The mixture is directed to a reformer where the fuel is steam reformed to produce a hydrogen rich stream which is utilized as the fuel for the electrochemical reactions occurring within the fuel stack.

BACKGROUND OF THE INVENTION

This invention concerns fuel cell systems and more specifically relates to providing fuel and steam mixtures to a reformer.

Early fuel cells generally utilized pure hydrogen as the preferred fuel. In an effort to make fuel cells commercially attractive, considerable efforts have been expended in the area of converting readily available fuels into hydrogen for use as the fuel in the fuel cell. Although various techniques have been proposed for converting hydrocarbon fuels, primary emphasis has been placed upon the catalytic conversion of hydrocarbons at relatively high temperatures. Systems for converting a hydrocarbon feedstock by reacting the stream in a high temperature catalytic steam converter to produce hydrogen and carbon oxide products are taught for example in Buswell et al., 3,446,594. Typically, in the prior art reformers, steam is provided through the use of a high temperature boiler which operates on temperatures on the order of 700–950° F. and heat is provided from the burner exhaust gases in the reformer.

Saturation of a gas with water vapor has been used to achieve a water vapor partial pressure. In the fuel cell art, the process air stream has been humidified to enable soda lime scrubbers to perform properly. In Blackmer, U.S. Pat. 3,061,658 a fuel cell is shown having means for humidifying the oxidant stream prior to passing it through the cathode compartments. This humidification is intended to prevent dehydration of the ion exchange membrane used in the fuel cell. In the fuel cell art, water vapor saturators have been used in conjunction with the process air streams and have been components external to the fuel cell.

SUMMARY OF THE INVENTION

It is an object of this invention to provide an improved method of cooling a low temperature fuel cell stack.

Another object of this invention is the saturation of a gaseous hydrocarbon fuel with water vapor from a fuel cell which has an operating temperature below 212° F. An aspect of this invention concerns the use of a hydrocarbon fuel in combination with water to cool the fuel cell stack.

A further object of this invention relates to methane saturation cooling of a fuel cell stack in combination with another means for removing at least a portion of the fuel cell waste heat.

In accordance with this invention a fuel saturator can be integral with the fuel cell stack by disposing the saturator within a cavity in the support plates between adjacent cells in the stack. The heat generated in the cells during the operation of the system will supply the energy to saturate the fuel with water supplied to the saturator cavity therein. If additional steam is required, a water boiler may be incorporated into the system for that purpose. In another embodiment, a coolant from the fuel cell stack may be directed to a fuel saturator separate from the stack where the heat taken from the cells by a coolant may be transferred to the fuel and water supply in the saturator. While the fuel saturator will function properly at higher water to fuel ratios, the saturator preferably operates at a water to fuel molar ratio of about 1.

BRIEF DESCRIPTION OF THE DRAWINGS

FIG. 1 is a diagammatic representation of a fuel saturator in a fuel cell system where the saturator is removed from the fuel cell stack.

FIG. 2 is an enlarged view of a saturator which may be used externally of the fuel cell stack.

FIG. 3 is a schematic section through a fuel cell stack showing an integral saturator within the separator plates.

FIG. 4 is a schematic representation through a fuel cell stack showing a modified integral fuel saturator.

DESCRIPTION OF THE PREFERRED EMBODIMENT

Referring now to FIG. 1, a fuel saturator 10 is shown having a supply of gaseous fuel provided through conduit 12 and a supply of liquid water through conduit 14. These streams are provided in a predetermined ratio to cavity 16 of the fuel saturator where the dry fuel travels a path through the cavity 16 which may be defined by moisture laden wicks 17. FIG. 2 shows a modified saturator where cavity 16 is filled with water and dry fuel bubbles through the liquid water and exits through conduit 18 as saturated fuel. Saturated fuel thereafter may be mixed with additional steam provided by boiler 20 and the mixture directed to reactor 22 where the hydrocarbon fuel and steam is catalytically reacted to provide hydrogen and other gaseous products. The hydrogen rich stream passes to a shift converter where carbon monoxide and steam in the stream is converted to further enrich the hydrogen content and reduce the carbon monoxide content of the stream. Thereafter the stream is directed to the anode compartments of the fuel cell stack 26 where the hydrogen is used as the fuel in the electrochemical reactions occurring in the individual fuel cells. The hydrogen depleted anode effluent is directed to burner 28 where the stream is combusted with air to provide the heat energy required by reactor 22. The hot burner gases exhaust through heat exchanger 30 providing the heat required to boil the liquid water in boiler 20.

The fuel cell stack 26 may be cooled by a liquid coolant, such as a mixture of glycol and water, traversing between adjacent cells. The fuel cell waste heat is directed through a coolant loop to the saturator 10 where the coolant passes through heat exchanger 32 associated with the saturator to provide heat to the saturator. Thereafter the coolant is directed to a radiator 34 to reduce the temperature of the liquid coolant and recycled through the cell stack. The method of circulating the coolant forms no part of the invention, the choice being within the ability of one skilled in the art.

The water to fuel ratio leaving the saturator depends upon the amount of heat available to evaporate the water. For example, if the desired water to fuel ratio were high, the water temperature would necessarily have to approach 212° F. However, when the desired water to fuel ratio is as low as 1, the saturator operating temperature can be as low as 180° F. Since the saturator may operate as low as 180° F., the minimum fuel cell operating temperature to supply this heat is lowered. Consequently, fuel cell waste heat may be utilized to saturate the fuel where the fuel cell operating temperature is below 212° F. The advantage of this system is that the size of the water boiler can be decreased or eliminated altogether. This provides an improved method for rejecting the fuel cell waste heat, reduces the size of the normal waste heat rejection equipment and simplifies the system. The water boiler described could be omitted but may be provided to increase the steam to fuel ratio when the carbon monoxide concentration in the anode feed must be reduced through the use of a shift converter. With lower carbon monoxide content in the fuel stream, the poisoning of the anode catalyst due to the presence of carbon monoxide may be minimized. Due to the advent of carbon monoxide tolerant anode catalysts, the boiler and shift converter may not be required.

Referring to FIG. 3, a fuel cell stack is shown having a plurality of individual cells each consisting essentially of electrodes 36 and 38 separated by a matrix 40. Spacer plates 42 separate adjacent fuel cells and end plates 44 are used to complete the cell stack. These end plates and spacer plates in cooperation with the electrodes form fuel passages 46 and oxidant passages 48. Liquid water is provided to opening 50 in the end and spacer plates through inlet 52 through proper manifolding in the plates. Water may be wicked up to the passages 50 through wick members 54. Openings 50 in the plates may be enlarged at the bottom to provide a reserve capacity of water or internal reservoir. Dry fuel is supplied through inlet 56 and thereafter directed up through openings 50 where the water is evaporated into dry fuel stream. Suitable ports 57 in the wick members are provided to facilitate the flow of dry fuel to the openings 50. Heat is generated as a result of the electrochemical reaction of hydrogen and oxygen. This heat boils the water in passages 50 and is normally considered waste heat. Waste heat not utilized in saturating the fuel, may be taken from the stack through external fins 58 or removed with either of the reactant gas streams. Saturated fuel is collected through manifold 60 and directed through outlet 62 to the catalytic reactor 22 in the same fashion as with the external fuel saturator. After the catalytic reaction, the hydrogen rich stream may be directed to a shift converter and to the anode compartments of the fuel cell stack.

A modification of this arrangement is shown in FIG. 4 where the liquid water essentially fills the cavity 50 in the end and spacer plates. In this ebullient saturator, the dry fuel bubbles through the water in spacer or end plate cavities thereby providing saturated fuel stream which may be directed to the reactor 22.

The particular technique featured to maintain the water level within the stack saturator or in the external saturator is a matter of design skill and will not be described herein. The rate of saturation is dependent to some extent on the saturator temperature, velocity of the dry fuel flow, passage flow paths and the like which can be adjusted to meet a specific system requirement. It is, of course, apparent that when integral saturators are featured, each end plate or spacer plate need not necessarily house a saturator.

Although the preferred embodiment of this invention has been shown and described herein it is to be understood that various changes and modifications may be made without departing from the spirit and scope of the invention.

I claim:

1. In combination, a fuel cell system having a plurality of spaced fuel cells arranged in a stack, each cell including spaced oxidant and fuel electrodes defining an electrolyte space therebetween, support plates interposed between adjacent fuel cells and defining with the electrodes of adjacent cells an oxidant chamber and a fuel chamber on each side thereof respectively, said oxidant chamber and said fuel chamber having inlet means, each support plate having a saturator cavity therein, at least a portion of the cavity containing water, a water inlet to the cavity, a fuel inlet to the cavity, and an outlet from the cavity and means for directing the saturated fuel to a steam reformer, wherein the saturated fuel is catalytically reacted to produce hydrogen, and means for directing said hydrogen to said fuel chamber inlet, said saturator also cooling the adjacent fuel cells during the operation of the system.

2. A system as in claim 1, including vertically extending wicking means disposed within said saturator cavity.

3. A system as in claim 2, including a water boiler interposed between the saturator cavity and the reformer for supplying additional steam to the saturated fuel.

4. In combination, a fuel cell system having a plurality of spaced fuel cells arranged in a stack and a steam reformer supplying fuel to the fuel cells, each cell including spaced oxidant and fuel electrodes defining an electrolyte space therebetween, support plates between adjacent fuel cells and defining with the electrodes of adjacent cells an oxidant chamber and a fuel chamber respectively, at least one of said support plates having a coolant cavity for the flow of coolant therethrough, and a fuel saturator having a cavity therein, a first inlet supplying water to the cavity, a second inlet supplying fuel to the cavity, heat exchange means cooperating with the saturator, means for directing the coolant from said fuel cell stack to said heat exchange means whereby heat generated in the cells is transferred to the saturator, and an outlet from the saturator for delivering saturated fuel to the steam reformer.

5. A system as in claim 4, wherein the fuel saturator cavity contains water at a predetermined level and the second inlet supplying fuel is disposed below the water level to provide bubbling of the fuel gas therethrough.

6. A system as in claim 5, including a water boiler interposed between the saturator and the reformer for supplying additional steam to the saturated fuel.

7. In a fuel cell system having a low temperature fuel cell stack consisting of a plurality of individual cells and a steam reformer wherein the hydrocarbon feedstock is catalytically reacted to provide a stream rich in hydrogen as a source of fuel for the fuel cell stack, the method of utilizing the fuel cell waste heat to evaporate water required in the steam reforming process comprising;

disposing a fuel saturator containing water within at least one support plate between adjacent fuel cells;

cooling the cells by vaporizing the water in the saturator;

directing a dry hydrocarbon fuel stream through the saturator whereby the dry fuel stream entrains water vapor; and feeding liquid water to the saturator in a predetermined ratio of water to fuel.

8. The method of claim 7, including:

supplying the liquid water to the saturator in the proportion of about 1 mol of water to 1 mol of fuel.

References Cited

UNITED STATES PATENTS 3,061,658  10/1962  Blackmer _____ 136—86

WINSTON A. DOUGLAS, Primary Examiner

H. A. FEELEY, Assistant Examiner

U.S. Cl. X.R.

136—120 FC